C. MITCHELL.
POWER TRANSMITTER.
APPLICATION FILED MAY 28, 1917.
1,265,805.
Patented May 14, 1918.
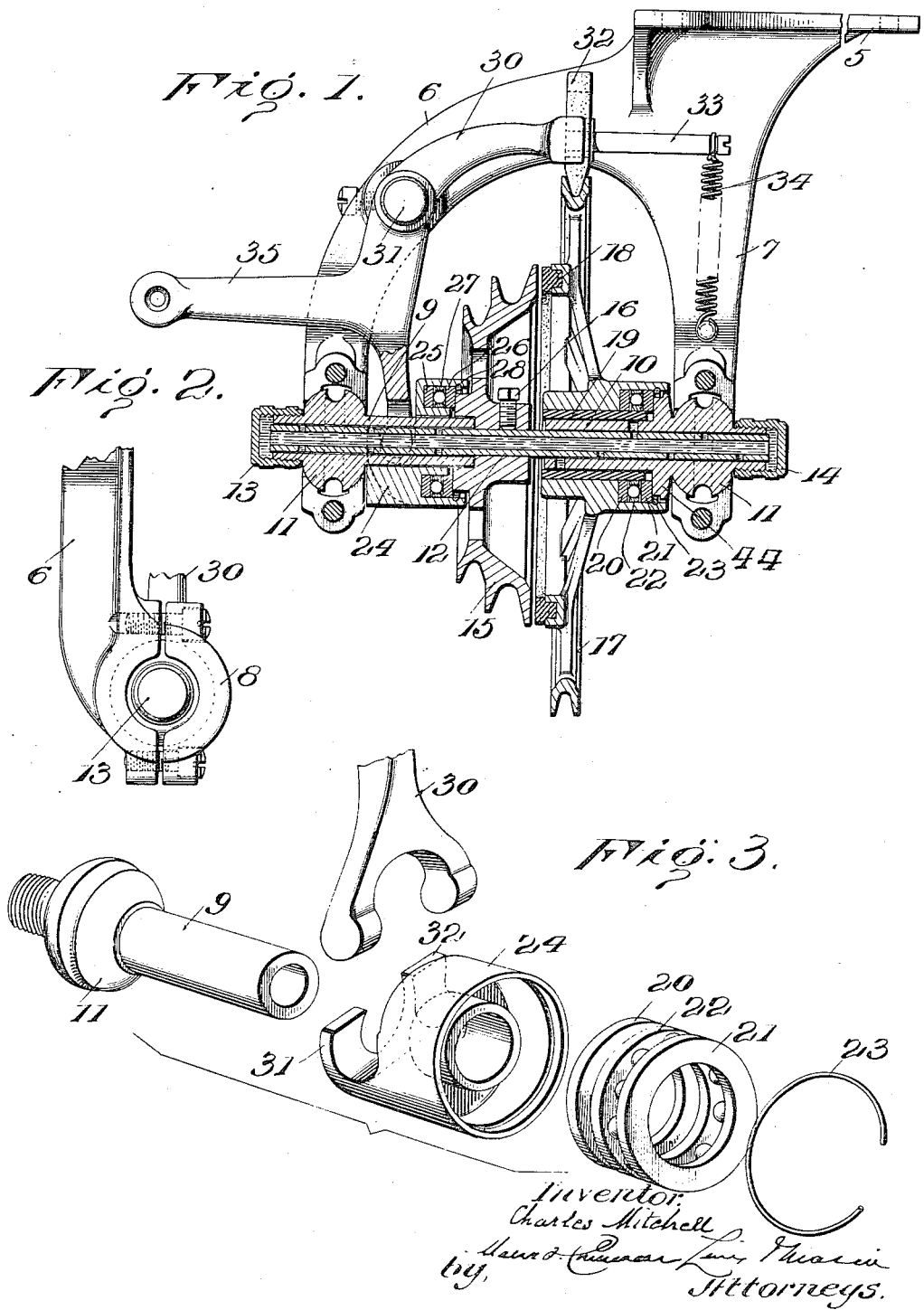

UNITED STATES PATENT OFFICE.

CHARLES MITCHELL, OF POUGHKEEPSIE, NEW YORK, ASSIGNOR TO WILLCOX & GIBBS SEWING MACHINE CO., OF NEW YORK, N. Y., A CORPORATION OF NEW YORK.

POWER-TRANSMITTER.

1,265,805.   Specification of Letters Patent.   Patented May 14, 1918.

Application filed May 28, 1917.   Serial No. 171,531.

*To all whom it may concern:*

Be it known that I, CHARLES MITCHELL, a citizen of the United States of America, and a resident of Poughkeepsie, New York, have invented a new and useful Improvement in Power-Transmitters, which invention is fully set forth in the following specification.

This invention relates to friction clutch power transmitters, especially designed for sewing machines, and of the general character of those shown in U. S. Patents Nos. 782,481, Feb. 14, 1905, Borton, and 1,196,469, Aug. 29, 1916, Merritt.

The objects, generally, are to provide a structure combining to a maximum degree the qualites of simplicity, durability, efficiency, and cheapness. The structural characteristics believed to attain such objects may be best understood from the accompanying drawing and detail description of what is regarded as the preferred embodiment of the invention. In said drawing—

Figure 1 is a vertical sectional view with parts in elevation;

Fig. 2 is an elevation of part of the structure looking from the left of Fig. 1; and Fig. 3 is a detail perspective view illustrating various parts of the structure.

5 is a bracket adapted to be secured to the underside of a sewing machine work-table or bench. It has depending arms 6 and 7 each having at its lower end a removable cap piece 8 (only one of which is shown) secured in place by screws. 9 and 10 are elongated tubular bearings or bearing sleeves, each having near one end a ball-like enlargement 11.

The inside surface of each cap 8 and the opposing end surface of its arm form sockets adapted to fit the approximately spherical surfaces of enlargements 11 on bearings 9 and 10, affording universal movement to each bearing and permitting it to assume any position with relation to its arm 6 or 7 necessary to the proper alinement of said bearings 9 and 10 with the shaft and other parts presently mentioned.

A hollow shaft 12 extends between the arms 6 and 7 and into the bearings 9 and 10. Said shaft is adapted to be charged with grease to be exuded through lateral perforations in its wall and lubricate relatively rotating surfaces. Grease cups 13, 14, are screw-threaded onto the outer extremities of bearings 9 and 10 over the open ends of shaft 12. The feeding of the grease or lubricant through the perforations in the wall of the hollow shaft to the surfaces to be lubricated is assisted by the pump-like action resulting from endwise movements of the shaft incident to throwing the transmitter into and out of action. A driving pulley 15 is secured to shaft 12, between the inner ends of bearings 9 and 10, by a set-screw or bolt 16. A driven pulley 17 has an annular friction surface 18 of leather or equivalent frictional material adapted to be engaged by a flat surface at the inner side of the driving pulley 15 in imparting motion from the latter to the driven pulley. The driven pulley rotates on the inner end of tubular bearing 10, the hub of the wheel being bored to receive a bearing sleeve 19 which contacts bearing 10. Two bearing rings 20 and 21, with interposed anti-friction bearing balls held in a ring-cage 22, and constituting a ball-race, are housed in the outer end of the hub of pulley 17 and retained in place by a spring wire ring 23. Bearing ring 21 contacts a flange 44 on bearing 10, which flange fits in the outer open end of the hub and substantially closes the same.

Turning now to the means for moving the driving pulley into engagement with the driven pulley to actuate the latter—24 is a follower sleeve embracing and movable longitudinally on bearing 9, said sleeve having an annular recess at its inner end for receiving the bearing rings 25 and 26 with interposed bearing balls held in a ring-cage 27, (constituting another ball-race) all retained in place in the recess of the sleeve by a spring wire ring 28. Ring 26 contacts the outer end of the hub of driving pulley 15 which projects slightly into said recess of the follower 24. A lever 30, fulcrumed to bracket arm 6 at 31, carries at one end a brake-block 32 adapted to bear in the peripheral groove of driven pulley 17; an extension 33 of the lever affords a connection for one end of spring 34, the other end thereof being anchored to bracket arm 7. At its lower end the lever 30 is forked around bearing 9 into engagement with two sockets formed by upwardly projecting hook-like lugs 31, 32 at the outer end of follower-sleeve 24. A horizontal arm 35 on lever 30 is adapted to be connected by a chain or other suitable means to a pedal or other operating means (not shown) under control of an operator.

In operation, when the operator applies power to render the power transmitter active, the downward pull on arm 35 swings the upper end of the lever 30 upward against the tension of spring 34, disengaging brake-pad 32 from driven wheel 17; the same movement of lever 30 causes its lower end to move the follower-sleeve 24, driving wheel 15, and shaft 12 toward the right, Fig. 1, thus engaging said driving wheel with the driven wheel 17 and imparting rotation to the latter. It will be noted that the follower-sleeve 24 acts through the anti-friction balls or ball-race in thus moving the continuously rotating driving pulley 15 and shaft 12; and also that the end thrust against driven pulley 17 is resisted by the anti-friction balls or ball-race at the outer end of the hub thereof. When the operator releases the control device the spring 34 reverses the movement of lever 30, releasing the pressure of follower 24 against the driving wheel 15 and engaging brake-pad 32 with the driven wheel to stop the same. The application of power through lever 30 and the forcing of the driving pulley into engagement with the driven pulley, tends to spread apart the lower ends of bracket arms 6 and 7. Any tendency to thus throw the bearing sleeves 9 and 10 out of alinement is taken care of by movement of said bearing sleeves on their ball and socket connections to the bracket arms.

In prior transmitters, with the continuously rotating driving pulley mounted upon a non-rotating shaft with interposed ball bearings, the noise of the balls has been found objectionable at periods when the driving pulley is running idle, that is, when not in engagement with the driving pulley and operating a sewing machine. In the present structure this is avoided by the use of a rotating shaft to which the driving pulley is fixed, by utilizing the ball-races merely to eliminate friction caused by end thrust when the transmitter is active, and by so disposing the ball-races—one upon the follower 24 and the other in a recess on the hub of the driven pulley 17—that they do not move or rotate when the driving pulley is running idle.

What is claimed is:—

1. In a power transmitter, the combination of supporting means, two bearing sleeves arranged opposite each other endwise and each directly supported from the supporting means, a shaft extending from one bearing sleeve into the other, a driving and a driven pulley or wheel supported by said bearing sleeves and shaft, and means under control of an operator for moving said pulleys relatively into engagement with each other to impart movement from the driving to the driven pulley.

2. In a power transmitter, the combination of supporting means, two bearing sleeves arranged opposite each other endwise and each directly supported from the supporting means, a shaft extending from one bearing sleeve into the other, a driving and a driven pulley or wheel, one pulley mounted upon one of the bearing sleeves and the other pulley mounted upon the shaft between the bearing sleeves, and means under control of an operator for moving said pulleys relatively into engagement with each other to impart movement from the driving to the driven pulley.

3. In a power transmitter, the combination of supporting means, two bearing sleeves arranged opposite each other endwise and each directly supported from the supporting means, a shaft extending from one bearing sleeve into the other, a driving and a driven pulley or wheel supported by said bearing sleeves and shaft, a follower on one of the bearing sleeves, and means under control of an operator for actuating the follower and through it moving one of the pulleys into driving engagement with the other.

4. In a power transmitter, the combination of supporting means, two bearing sleeves arranged opposite each other endwise and each directly supported from the supporting means, a shaft extending from one bearing sleeve into the other and supported thereby, a driving and a driven pulley or wheel supported by said bearing sleeves and shaft, means under control of an operator for moving said pulleys relatively into engagement with each other to impart movement from the driving to the driven pulley, and anti-friction means—such as ball-bearings—receiving the end thrust of the pulleys while held in driving engagement with each other.

5. In a power transmitter, the combination of supporting means, two bearing sleeves arranged opposite each other endwise and each having an universal joint connection with a part of the frame whereby the bearing sleeves can assume a position of alinement with each other, a shaft extending from one bearing sleeve into the other, a driving and a driven pulley or wheel supported by said bearing sleeves and shaft, and means under control of an operator for moving said pulleys relatively into engagement with each other to impart movement from the driving to the driven pulley.

6. In a power transmitter, the combination of a bracket having two arms, two bearing sleeves having ball-like portions engaged by sockets of the arms respectively in supporting the sleeves, a shaft extending from one sleeve into the other, a driving and a driven pulley or wheel supported by said bearing sleeves and shaft, and means under control of an operator for shifting one pulley into engagement with the other to transmit movement from the driving to the driven pulley.

7. In a power transmitter, the combination of a bracket having two arms, two bearing sleeves having ball-like portions engaged by sockets of the arms respectively in supporting the sleeves, a shaft extending from one sleeve into the other, a driving and a driven pulley or wheel supported by said bearing sleeves and shaft, a follower on one of the bearing sleeves between one of the bracket arms and one of the pulleys, and means under control of an operator for actuating the follower and through it moving one of the pulleys into driving engagement with the other.

8. In a power transmitter, the combination of a bracket having two arms, two bearing sleeves having ball-like portions engaged by sockets of the arms respectively in supporting the sleeves, a shaft extending from one sleeve into the other, a pulley supported on one of the bearing sleeves, end-thrust anti-friction means—such as ball-bearings—between said pulley and an enlargement on said sleeve, a second pulley supported on the shaft between the bearing sleeves, a follower movable on the other sleeve, end-thrust anti-friction means—such as ball-bearings—between said follower and the pulley on the shaft, and means under control of an operator for actuating the follower and through it moving one of the pulleys into driving engagement with the other.

9. In a power transmitter, the combination of supporting means, two bearing sleeves mounted upon the supporting means and arranged opposite each other endwise, a shaft extending from one bearing sleeve into the other said shaft being hollow to contain lubricant and having passages through its wall for conducting lubricant to the contacting surfaces of the shaft and bearing sleeves, a driving and a driven pulley or wheel supported by said bearing sleeves and shaft, the driving pulley being secured to the shaft, and means under control of an operator for moving said driving pulley—and with it the shaft—into driving engagement with the driven pulley, such movement of the shaft assisting in feeding lubricant to the bearings.

10. In a power transmitter, the combination of supporting means, two bearing sleeves carried by the supporting means and arranged opposite each other endwise, a shaft extending from one bearing sleeve into the other and rotatably supported thereby, a driving pulley secured to said shaft between the bearings, a driven pulley rotatable on one of said bearing sleeves, and means for moving said pulleys relatively into engagement with each other to drive the driven pulley from the driving pulley.

11. In a power transmitter, the combination of supporting means, two bearing sleeves carried by the supporting means and arranged opposite each other endwise, a shaft extending from one bearing sleeve into the other and rotatably supported thereby, a driving pulley secured to said shaft between the bearings, a driven pulley rotatable on one of said bearing sleeves, means for moving said pulleys relatively into engagement with each other to drive the driven pulley from the driving pulley, and a ball-race for each pulley disposed to take the end thrust thereof when the pulleys are held in driving engagement with each other, the ball-race for the driving pulley being non-rotatable therewith when said pulley is running idle.

In testimony whereof I have signed this specification.

CHAS. MITCHELL.